United States Patent [19]

Yoshida

[11] Patent Number: 5,889,817
[45] Date of Patent: Mar. 30, 1999

[54] COMMUNICATION SYSTEM WITH DATA COMPARISON CIRCUIT

[75] Inventor: Yutaka Yoshida, Nagoya, Japan

[73] Assignee: Fuji Electric Co., Ltd., Kawasaki, Japan

[21] Appl. No.: 888,136

[22] Filed: Jul. 3, 1997

[30] Foreign Application Priority Data

Jul. 10, 1996 [JP] Japan .................................. 8-180472

[51] Int. Cl.⁶ .................. H04B 1/38; H04L 5/16
[52] U.S. Cl. .................... 375/220; 395/821; 395/879
[58] Field of Search .................. 375/220, 222; 395/821, 879; 370/473, 514

[56] References Cited

U.S. PATENT DOCUMENTS

| | | | |
|---|---|---|---|
| 4,200,930 | 4/1980 | Rawlings et al. | 364/200 |
| 4,292,669 | 9/1981 | Wollum et al. | 364/200 |
| 4,989,135 | 1/1991 | Miki | 364/200 |
| 5,010,477 | 4/1991 | Omoda et al. | 364/200 |
| 5,199,081 | 3/1993 | Saito et al. | 382/2 |
| 5,331,551 | 7/1994 | Tsuruoka et al. | 364/413.13 |
| 5,412,660 | 5/1995 | Chen et al. | 370/110.1 |
| 5,487,153 | 1/1996 | Hammerstorm et al. | 395/250 |

OTHER PUBLICATIONS

Fieldbus Standard for Use in Industrial Control Systems, Part 2, Physical Layer Specification and Service Definition (ISA–S 50.02).

IEC Data Link Layer Protocol Ver 4.2 Instrument Society of America 1995.

Primary Examiner—Stephen Chin
Assistant Examiner—Mohammad Ghayour
Attorney, Agent, or Firm—Kanesaka & Takeuchi

[57] ABSTRACT

A communication apparatus includes an automatic reception stop circuit. When a transmit frame sent by another communication apparatus is received, the automatic reception stop circuit compares the specific code included in the transmit frame with the values written to the register beforehand. Based on the results of this comparison, the automatic reception stop circuit stops the reception of the transmitted frame that is considered useless by the communication apparatus.

8 Claims, 13 Drawing Sheets

COMMUNICATION SYSTEM WITH DATA COMPARISON CIRCUIT

BACKGROUND OF THE INVENTION AND RELATED ART STATEMENT

The present invention relates to a communication control circuit for transmission and reception of data, and in particular, to an interface control LSI apparatus for an industrial measurement communication network "field bus".

Figure 9:
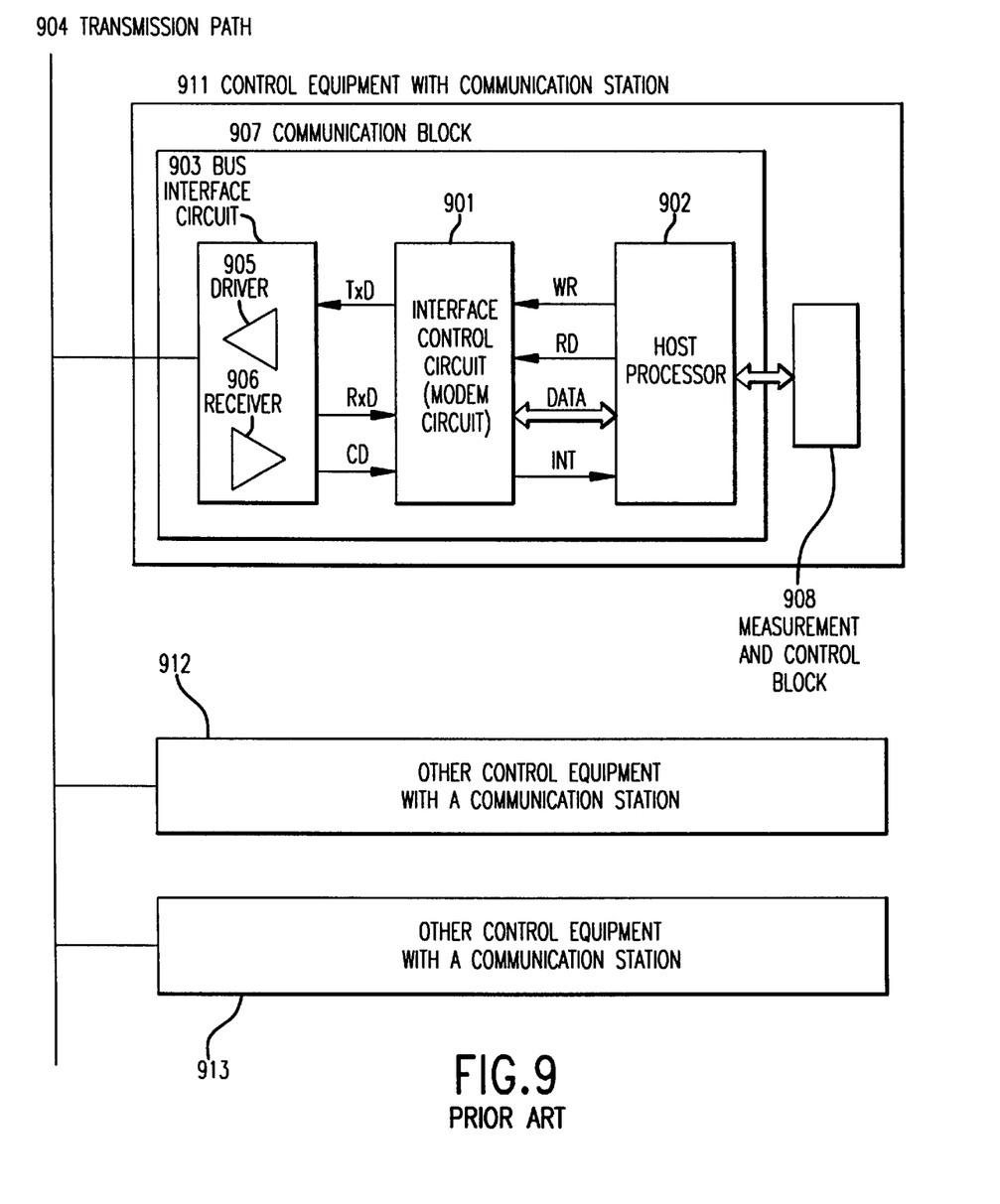
FIG. 9 shows the structure of a conventional communication apparatus with a field bus.
Figure 10:
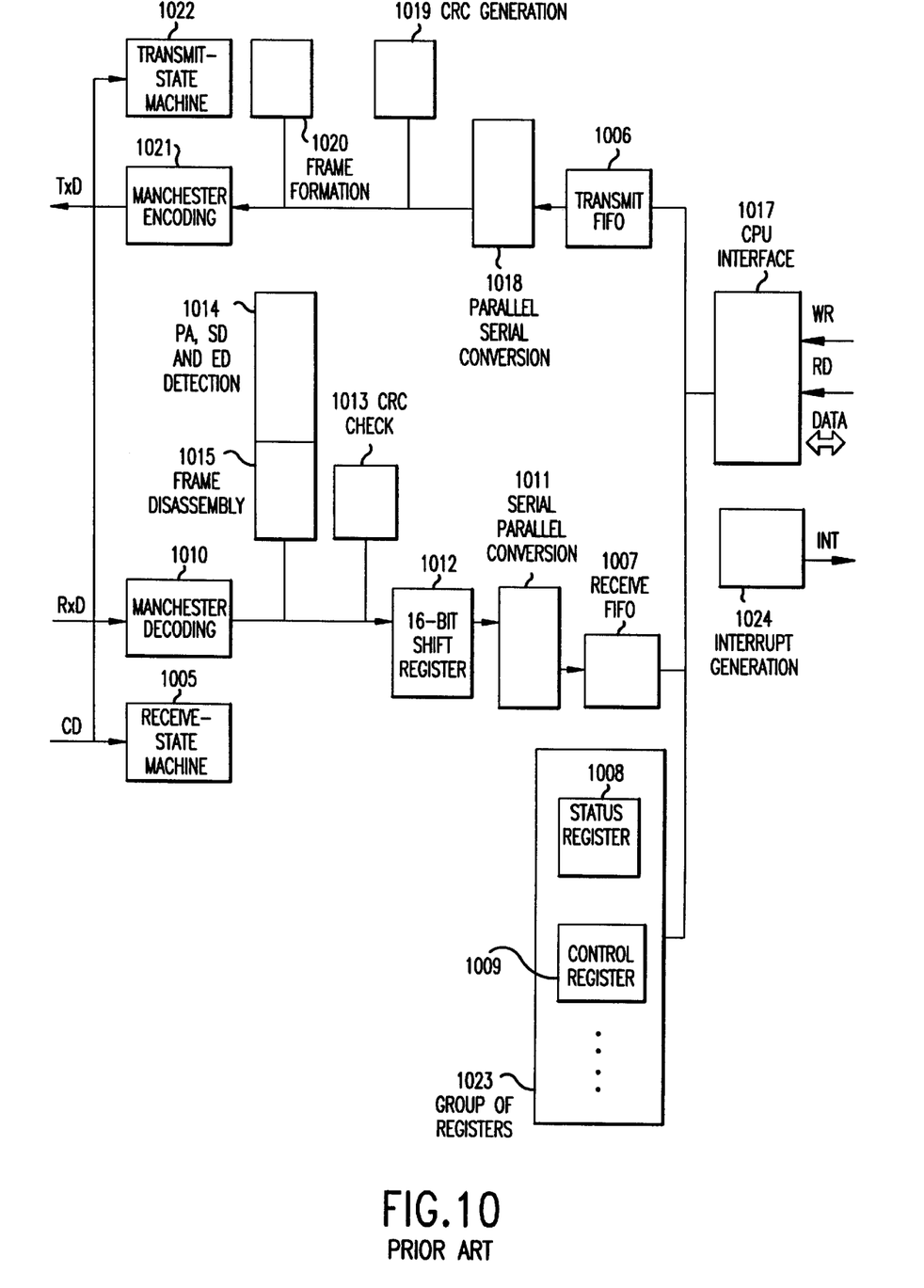
FIG. 10 shows the structure of an interface control circuit for the conventional communication apparatus with a field bus.

FIGS. 9 and 10 show an outline of a communication apparatus using a conventional field bus.

In a communication system using a field bus as shown in FIG. 9, each of measurement and control equipments 911, 912, 913 with communication stations to which measurement blocks 908, such as programmable controller, pressure transmitter or flow transmitter, are attached, is connected to a pair of transmission paths 904 to mutual transmission and reception.

A communication block 907 in the measurement and control equipment with a communication station 911 comprises a bus interface circuit 903 connected to a transmission path 904, an interface control circuit or a modem circuit 901, and a host processor or a microcontroller 902 for controlling the interface control circuit 901.

The microcontroller 902 reads the measured values, manipulates actuators, and displays/instructs to external input/output devices relative to the measurement and control block 908.

The microcontroller 902 writes and reads transmit and receive data to and from the interface control circuit 901. During transmission, the interface control circuit 901 outputs TxD and a driver circuit 905 sends this signal out to the transmission path 904.

During reception, a receiver 906 outputs the signal on the transmission path 904 to the interface control circuit 901 as RxD.

When a signal is present on the transmission path 904, the receiver 906 outputs a CD signal to the interface control circuit 901.

FIG. 10 shows a detailed block diagram of the interface control circuit 901.

The microcontroller 902 writes transmit byte (8 bits) data to a transmit FIFO (First In First Out) 1006 in the interface control circuit 901 via a CPU interface 1017.

The interface control circuit 901 monitors the state of the transmission path 904 via a bus interface circuit 903 using the CD signal, and if no other communication station, e.g. 912 and 913, is sending a transmission, a transmission may be initiated.

A series of transmission operations is performed by a transmit state machine 1022 built in the interface control circuit 901, while the microcontroller 902 writes transmit data to a transmit FIFO 1006.

The interface control circuit 901 converts 8-bit byte data (parallel data) into serial data (1018), and adds a preamble and a start delimiter to the beginning of the data as well as 16-bit CRC and an end delimiter to the end of the data in order to form a transmit frame (1020).

These specially added codes are used at the receiver to match the length of one bit, detect the first and last byte positions of the frame, and check the presence of an error.

Figure 11:
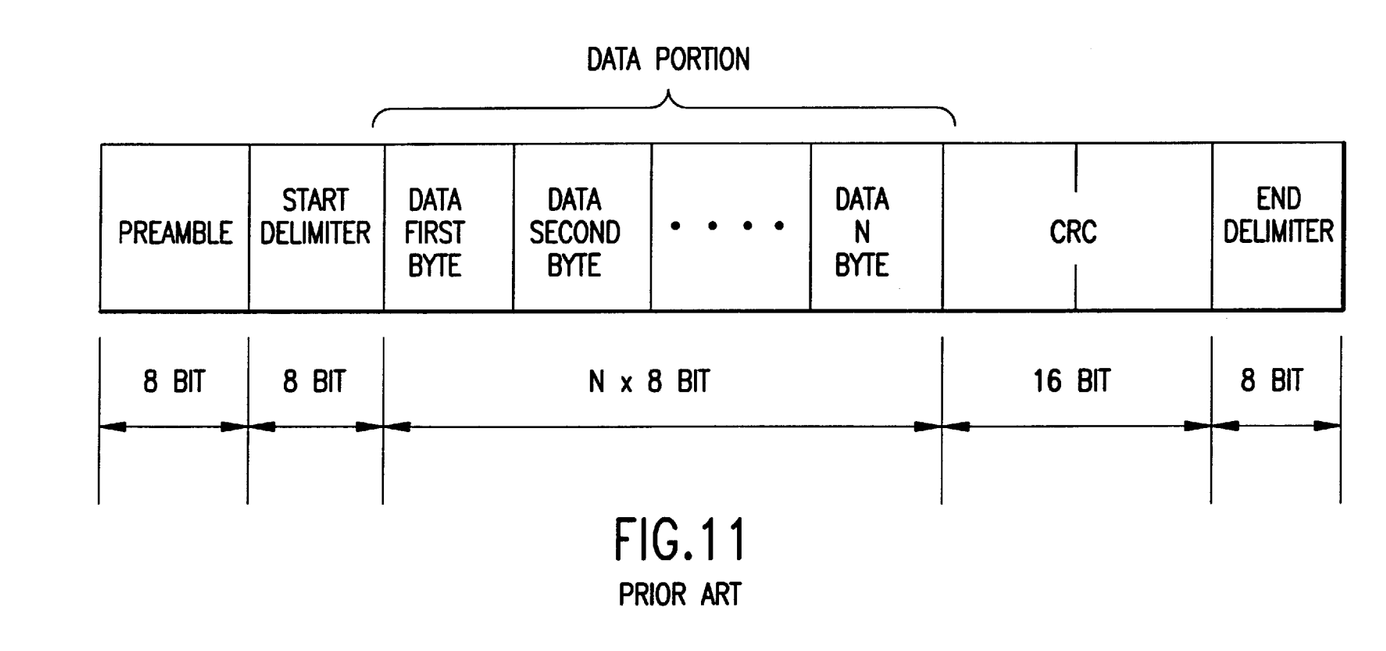
FIG. 11 shows the structure of a frame for the conventional communication apparatus with a field bus.

FIG. 11 shows the structure of a frame. The start and end delimiters include a special code to be differentiated from other components, but the preamble, data and CRC are formed of logical values 1 and 0.

The frame to be transmitted is encoded into Manchester codes (1021), which are then converted into voltage waveforms on the transmission path 904 by the driver circuit 905 in the bus interface circuit 903.

The control equipment with a communication station 911 and the other control equipments with communication stations 912 and 913 normally wait for a reception. When one communication station starts transmission, the voltage waveform on the transmission path 904 is converted into a digital signal (RxD) by the receiver circuit 906 in the bus interface circuit 903, and this digital signal (RxD) is received by the interface control circuit 901.

In FIG. 10, a series of reception operations is performed by a receive-state machine 1005. The received signal is Manchester-decoded (1010); the preamble and the start and end delimiters are removed (1015); and the CRC code is checked for errors (1013).

The serial data is sequentially converted into 8-bit byte data (1011), which is then stored in a receive FIFO 1007.

Once a specified number of bytes of the receive data has been accumulated in the FIFO 1007, an interrupt generator (1024) generates an interrupt signal (INT) to the microcontroller 902 to inform it of the presence of the receive data, and the microcontroller 902 reads the data from the receive FIFO 1007.

Since there are other causes for the generation of the interrupt signal (INT), an interrupt cause status register 1008 indicating a cause of generation of the interrupt signal (INT) is provided to allow the microcontroller 902 to read this register to find the cause of the interruption.

Only the data portion of the receive frame is stored in the receive FIFO 1007, and the CRC code is not written to the FIFO 1007 except in special cases.

Figure 12:
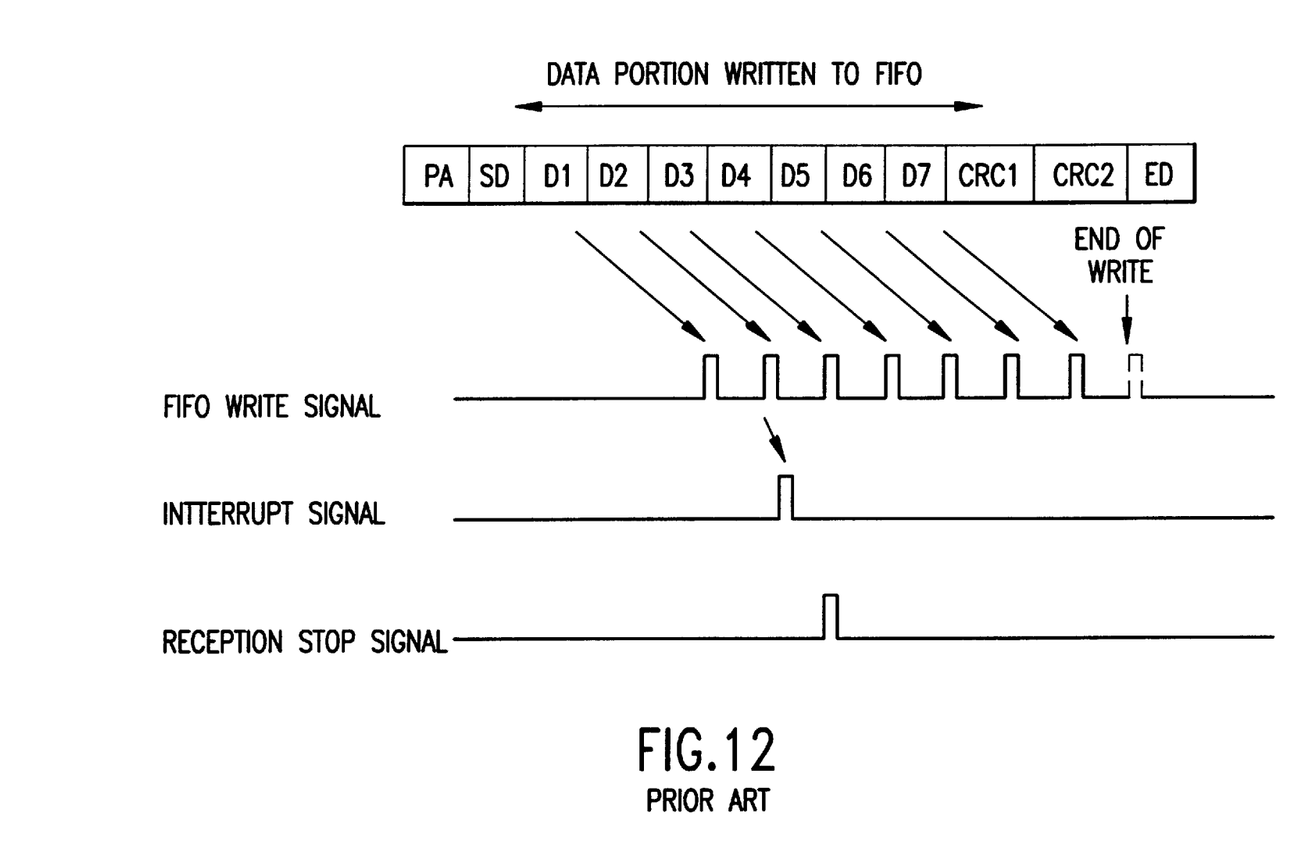
FIG. 12 shows timing for a reception operation of the conventional communication apparatus with a field bus.

After detecting the presence of the receive data, the microcontroller 902 reads the data from the receive FIFO 1007. FIG. 12 shows the main timings for a receiving operation.

The writing to the receive FIFO 1007 is carried out 2 bytes after the data is loaded because the 2-byte CRC code following the data is not written to the FIFO 1007. The modem circuit does not know the length of the data beforehand, so it can not identify the boundary between the data and the CRC code.

Thus, a 16-bit shift register 1012 is provided between a Manchester decoding circuit 1010 and a serial/parallel conversion circuit 1011, so that the first byte of data is written to the receive FIFO 1007 after the third byte of data has been received, and the writing to the FIFO is completed when the end delimiter is detected. Consequently, when the end delimiter is detected, the two bytes preceding the end delimiter are determined to be a CRC code to prevent it from being written to the FIFO.

As shown in FIG. 12, if it is assumed that a threshold for the receive FIFO 1007 is 2 bytes and that the interrupt signal is generated when 2 bytes of data have been accumulated therein, an interruption occurs after the reception of the fourth byte of data, and the microcontroller 902 subsequently notes the presence of the receive data.

Data to be transmitted is not necessarily required by all the stations that are receiving the data.

Even if the communication station does not require the received data, the microcontroller 902 reads the received data to determine whether it is unnecessary, and if so, it outputs a reception stop instruction via a control register 1009 in order to suspend the receiving operation.

Figure 13:
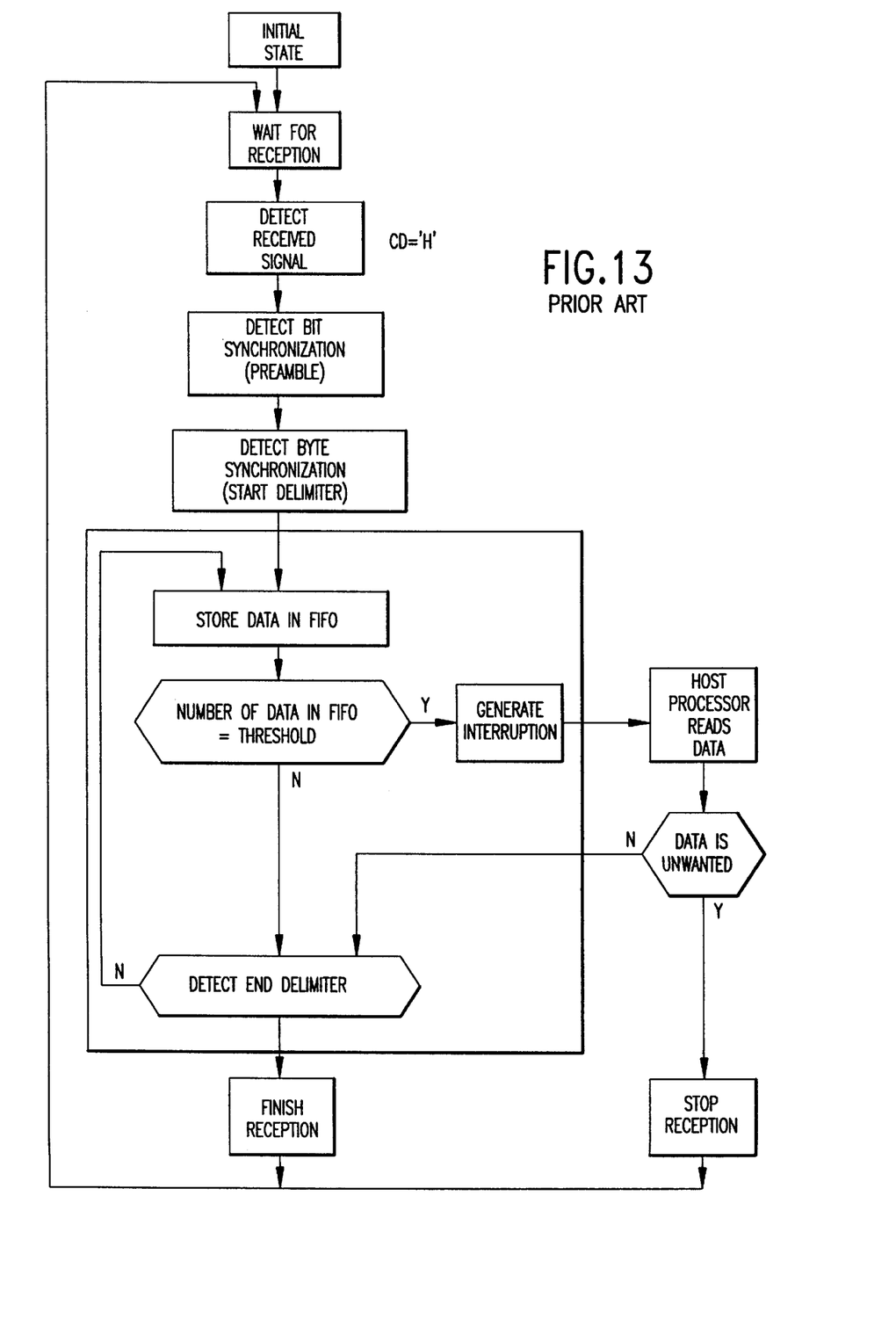
FIG. 13 shows a flow chart of the reception operation of the conventional communication apparatus with the field bus.

FIG. 13 shows a flow chart describing a receiving operation and the stoppage of the reception of the unnecessary data. Namely, data is transferred to FIFO from a condition of "wait for reception" through the operations of "detect received signal", "detect bit synchronization" and "detect byte synchronization".

When the number of data in FIFO comes to a predetermined threshold value, interruption occurs, so that the host processor knows the presence of the data in FIFO. As a result, the host processor reads the data in FIFO and determines if the data is required in the station. If the data is unwanted, the host processor outputs a stop reception signal through the control register 1009 and suspends the data reception operation. If the data is wanted, the reception of the data is continued.

After the reception has been stopped, the reception stop state is maintained until the receive frame has been finished. Once the receive frame has disappeared, the station returns to a reception wait state.

According to the conventional communication apparatuses, all the stations other than a transmitting station which are ready for reception receive data irrespective of whether the data is unwanted, and the host processor reads the receiving data accumulated in the receive FIFO to determine whether the read data is unwanted.

Thus, whenever other stations carry out transmissions, the host processor is activated and consumes power.

In addition, a certain amount of time must pass before the reception stop instruction is issued by the host processor. The example shown in FIG. 12 can not stop the reception before 4 bytes of data portion of the receive frame are received.

This invention has been made in view of the above points, and its object is to maintain the host processor in a sleep mode until the required receive frame has reached the communication station in order to reduce the power consumed by the communication apparatus.

SUMMARY OF THE INVENTION

To achieve the above object, a first aspect of the invention provides a system including two or more communication apparatuses connected to a pair of transmission paths for mutual transmissions, wherein each communication apparatus includes an interface circuit for working with a host processor to control input and output data between the host processor and the transmission paths.

The interface circuit includes a frame formation circuit that operates to form a specific code in the transmit frame when data written by the host processor is converted into a transmit frame; and an automatic reception stop circuit that operates, when the transmitted frame sent by another communication apparatus is received, to compare the value of the specific code included in the transmitted frame with the value of a pre-written code in order to stop receiving unwanted transmit frame.

According to a second aspect of the invention, in the communication system set forth in the first aspect of the invention, the automatic reception stop circuit has a position specification code for specifying a position at which the value of the specific code included in the transmitted frame is compared with the value of the pre-written code, wherein the bits specified by the position specification code are compared.

According to a third aspect of the invention, in the communication system set forth in either the first or second aspect of the invention, the host processor can change the value of the code written to the automatic reception stop circuit beforehand.

According to a fourth aspect of the invention, in the communication system set forth in any of the first to third aspects of the invention, the interface circuit stops the reception of unwanted frames before informing to the host processor of the presence of received data by using an interrupt signal.

BRIEF DESCRIPTION OF THE DRAWINGS

FIGS. 2(*a*) and 2(*b*) show frames used by the interface control circuit to determine whether reception should be stopped according to the invention;

FIGS. 5(*a*) and 5(*b*) show embodiments of a received data frame code comparison and determination circuit, and a frame code/address comparison and determination circuit according to the invention;

DETAILED DESCRIPTION OF PREFERRED EMBODIMENTS

The communication block 907 shown in FIG. 9 as a conventional example consists of th e bus interface circuit 903 to which a relatively high voltage is applied to deal with analog signals; the interface control circuit 901 which copes with various transmission speeds, modulation methods, frame forms, and error checks which vary depending on communication protocols, and which has a data buffer function; and the microcontroller 902 for managing the processing and communication of a measurement and control system. The communication block normally consists of one or more chips.

According to the invention, the interface control circuit 901 and the microcontroller 902 are formed on different chips.

Figure 1:
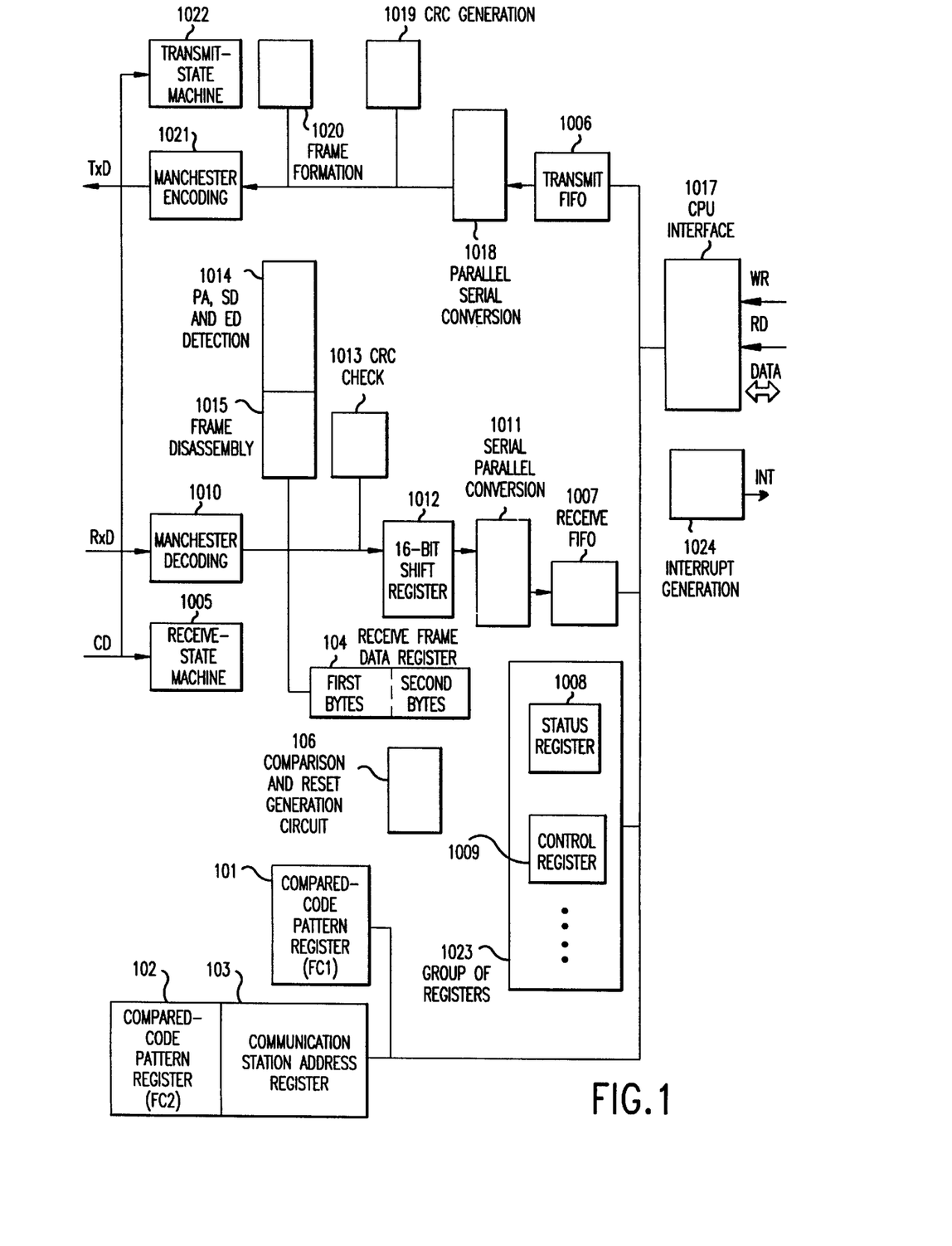
FIG. 1 is a block diagram of one embodiment of a modem circuit including an interface control circuit according to the invention.

FIG. 1 shows a block diagram of one embodiment of a modem circuit including an interface control circuit according to the invention.

FIG. 1 differs from FIG. 10 which shows a conventional example, in that the circuit in FIG. 1 has registers 101, 102 and 103 for storing frame code patterns FC1 and FC2 used to determine whether reception should be stopped, and the address of the station; a register 104 for retaining the first and second bytes of a received frame; and a circuit 106 for comparing the patterns FC1 and FC2 with the first and second bytes of the received frame to generate a reset signal to the receive-state machine 1005.

Figure 2A:
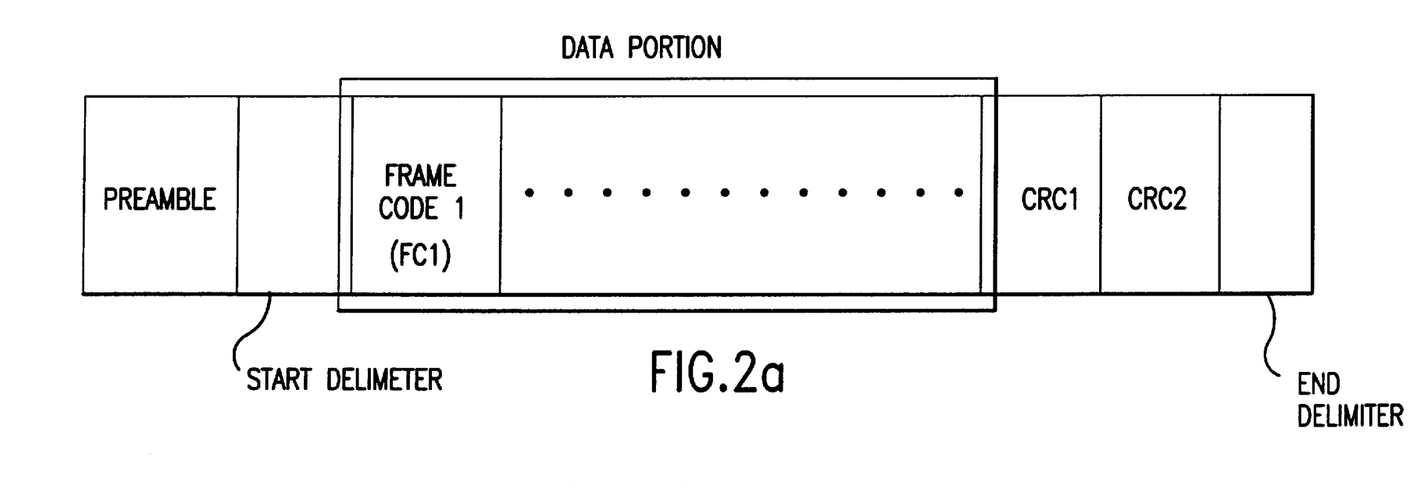
Figure 2B:
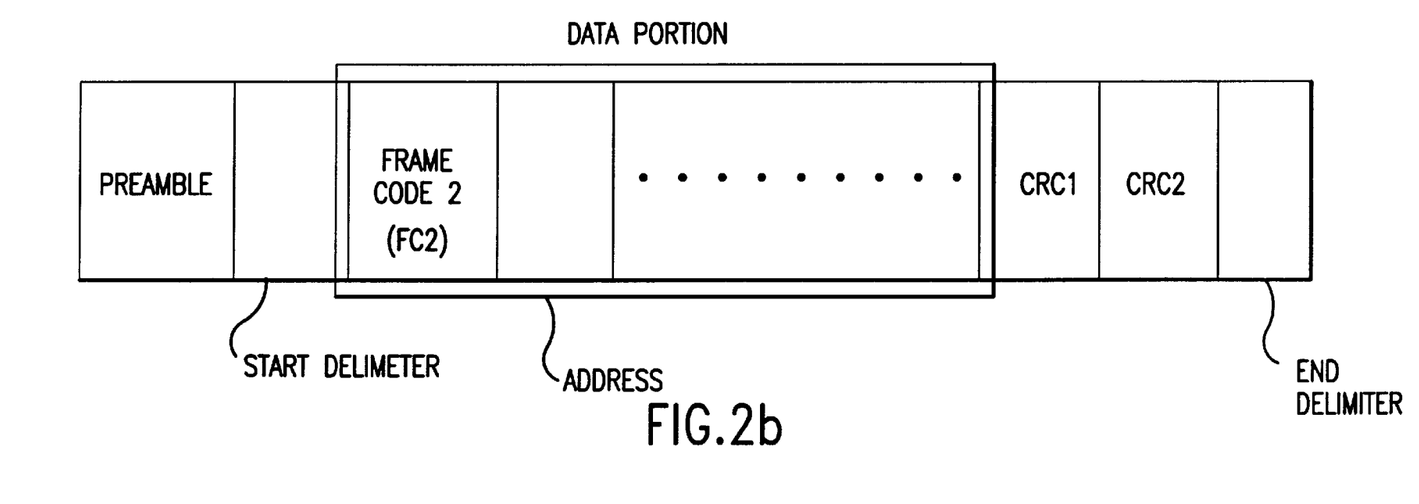

FIGS. 2(a) and 2(b) show embodiments of frame structures used to determine that reception should be stopped. In FIG. 2(a), if the pattern of the frame code in the first byte of a data portion matches a specific pattern (not acceptable), reception is stopped, and this frame code is FC1.

In FIG. 2(b), if the pattern of the frame code in the first byte of a data portion matches a specific pattern (acceptable) and a second address does not match the address of the station, reception is stopped, and this frame code is FC2.

A compared-code pattern register 101 corresponding to FC1 and a compared-code pattern register 102 corresponding to FC2 are illustrated, but compared-code pattern registers and comparison and reset generating gates corresponding to these compared-code pattern registers may be added as required to increase the number of frames used to determine whether reception should be stopped.

Figure 4:
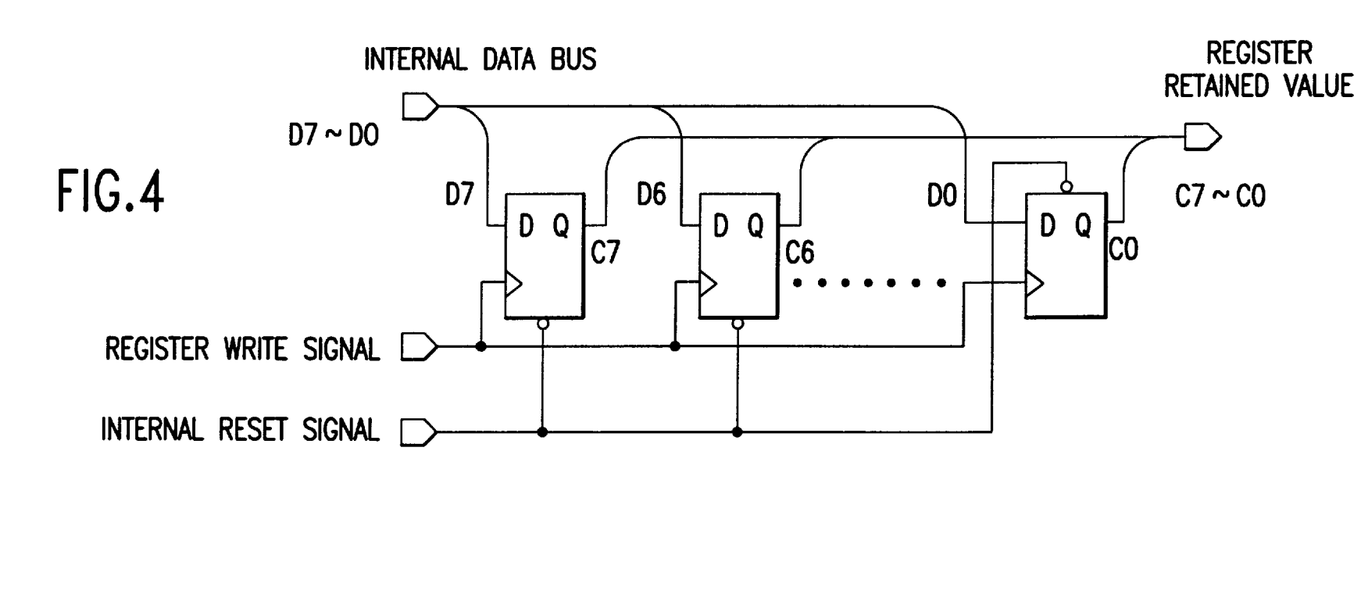
FIG. 4 shows one embodiment of a register circuit for specifying a compared-code pattern and compared bit positions according to the invention.

FIG. 4 shows a circuit diagram of a register in an automatic reception stop circuit provided in the modem circuit according to the invention, wherein the register specifies a compared-code pattern and compared bit positions.

The compared-code pattern represents one of several tens of types of the frame codes for which reception is most frequently stopped.

The frame code is specified and fixed by a communication protocol, but may be rewritten if the standard is to be changed or the frame code itself, which is used to determine whether reception should be stopped, is to be changed.

Figure 5A:
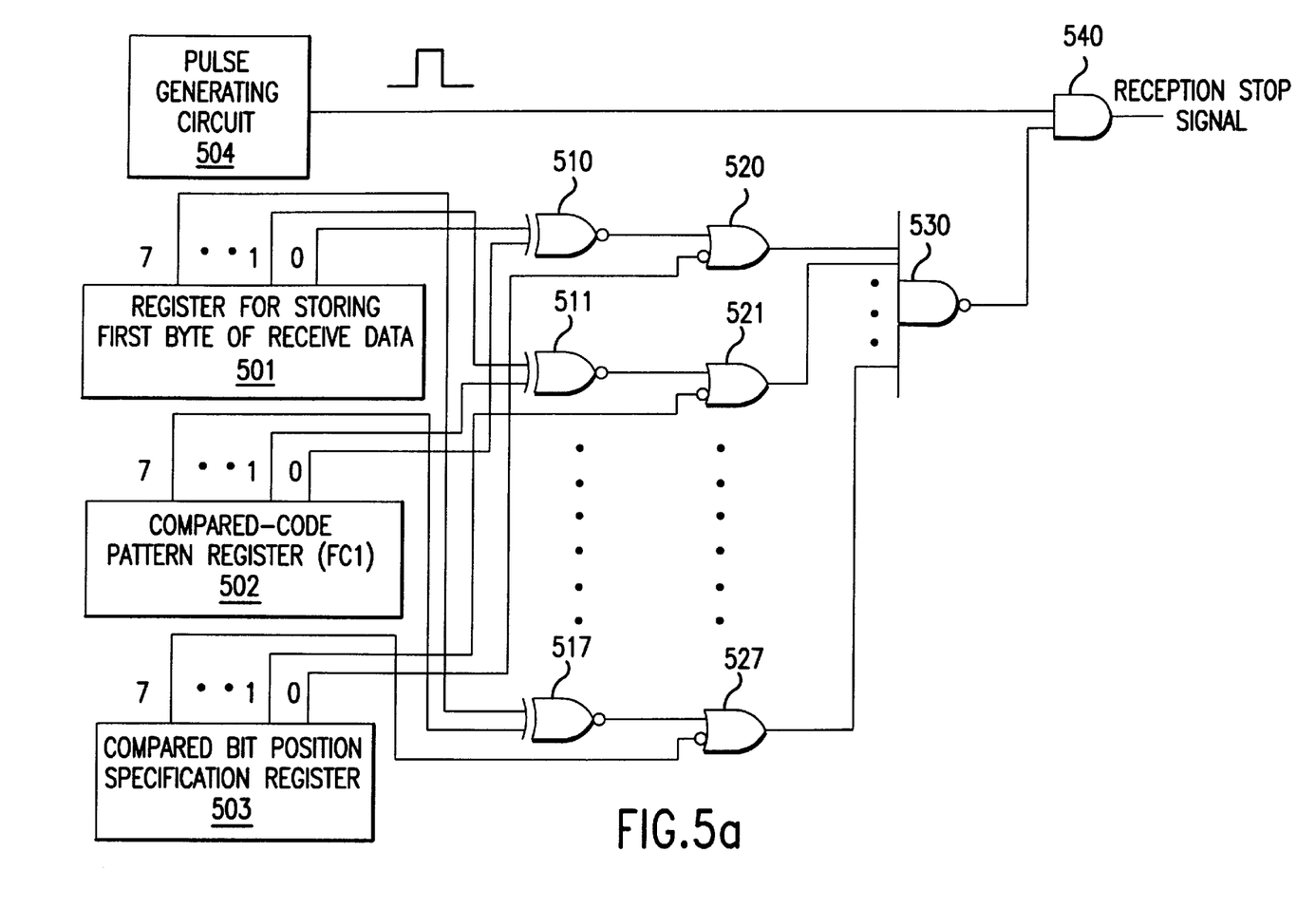

FIG. 5(a) shows an embodiment of a circuit for determining from the first byte of the received data as to whether reception should be stopped.

The first byte of the data of a receive frame is stored in an 8-bit register 501 (received from data register 104 in FIG. 1); a compared-code pattern (FC1) is stored in a register 502 (compared-code pattern register 101 in FIG. 1); and compared bit positions are stored in a register 503 (not shown in FIG. 1).

Each bit of the first byte of the data of the receive frame is compared with the corresponding bit of the compared code pattern by an XNOR gate 510, 511, . . . 517. Those bits which need not be compared are masked by OR gates 520, 521, . . . 527 based on the output of the compared bit position specification register 503. After the first byte of data has been obtained, if a pulse is generated by a pulse-generation circuit 504, an AND gate 530 outputs logical 1, and the station thus determines that the received frame is unwanted, so that an AND gate 540 outputs a reception stop signal.

Figure 5B:
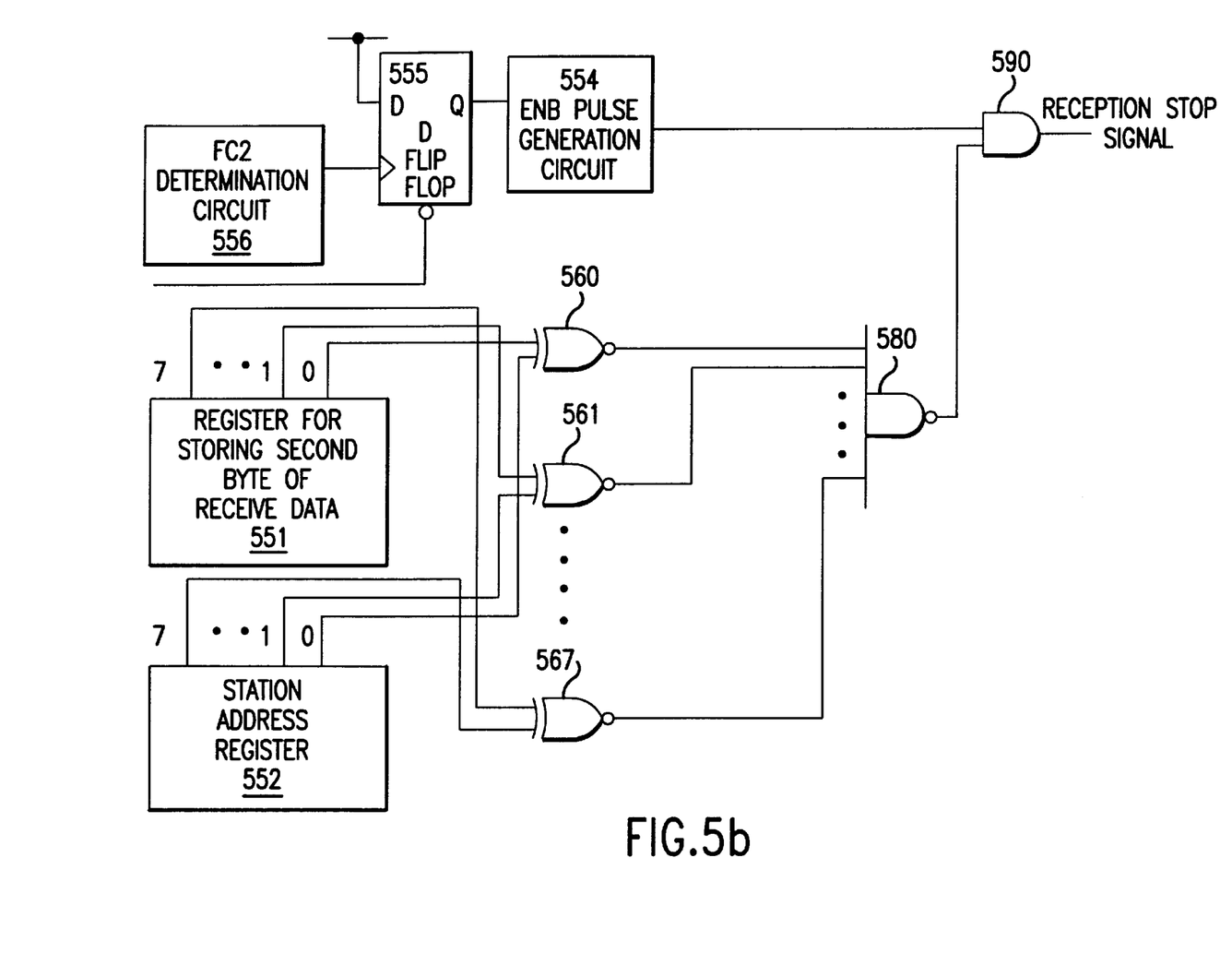

FIG. 5(b) shows a determination circuit for determining from the first and second bytes of the data in the receive frame as to whether reception should be stopped.

The FC2 determination circuit 556, which is shown in FIG. 5(b), is equivalent to the circuit for determining from the first byte of the received data whether reception should be stopped, as shown in FIG. 5(a). The first byte of the FC2 is written in the determination circuit 556 as a comparedcode pattern, and the corresponding compared bit position is also specified in the determination circuit 556.

When the received frame code is determined to be the same as the first byte of the FC2, a Q output of a D flip flop 555 is set to logical 1.

An enable (ENB) input of the pulse-generation circuit 554 becomes active and operative.

The address of the station in the FC2 is written in an address register 552 beforehand.

The second-byte data of the receive frame is stored in a register 551, and then compared with the station address register 552.

The comparison method is the same as the method described in FIG. 5(a). If the address in the receive frame is different from the address of the station, the output of a NAND gate 580 becomes logical 1.

If the enable (ENB) input from the D flip flop 555 is active, after the second-byte data of the receive frame is taken into the register 551, a pulse-generation circuit 554 outputs a pulse. If the addresses do not match, an AND gate 590 outputs the reception stop signal.

Figure 3:
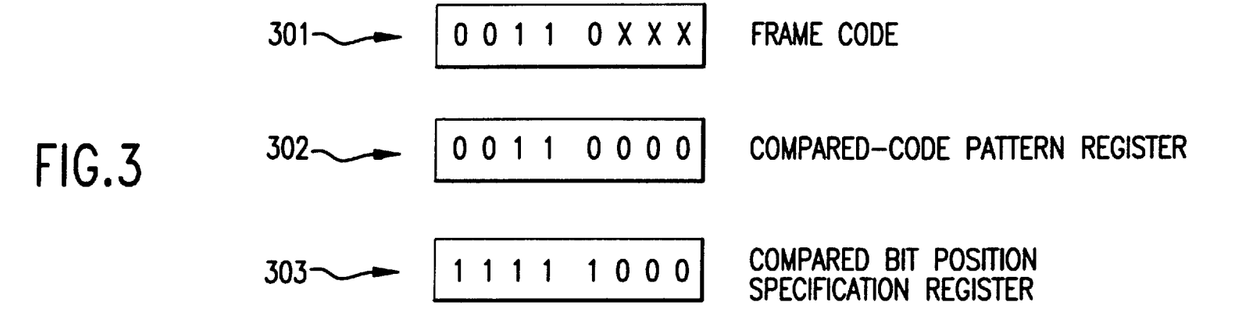
FIG. 3 shows embodiments of a compared-code pattern and compared bit positions according to the invention.

FIG. 3 shows three examples of a frame code, and bit patterns of the compared-code and compared bit position according to this invention, each having eight bit positions.

As described above, number of gates or frame codes used by the register 101 for the compared-code pattern corresponding to FC1 and the register 102 for the compared-code pattern corresponding to FC2 in order to determine whether reception should be stopped can be increased by adding compared-code pattern registers and comparison and reset generation gates corresponding to these registers, as required.

Furthermore, the value of the frame code is not fixed in all the bits thereof, and some bits may be either logical 0 or logical 1 depending on the optional setting.

The bit positions indicated by X in the frame code 301 shown in FIG. 3 are optional bits indicating an address length or a frame transfer status, and may be either logical 0 or logical 1. The pattern 301 in the frame code is one example included in the transferred data; the bit pattern 302 in the compared-code pattern register is registered in the register 101 or 102; and the pattern 303 in the compared bit position specification register is an example included in the register 503 in FIG. 5(a). These patterns are shown for examples only.

In this case, to prevent these bits from being compared, a compared bit position specification register 303 indicating the bit positions is provided.

In the register for specifying a compared-code pattern and the compared bit positions shown in FIG. 4, a frame code and the corresponding bit positions to be compared can be set by an internal reset signal and rewritten by the microcontroller.

Figure 6:
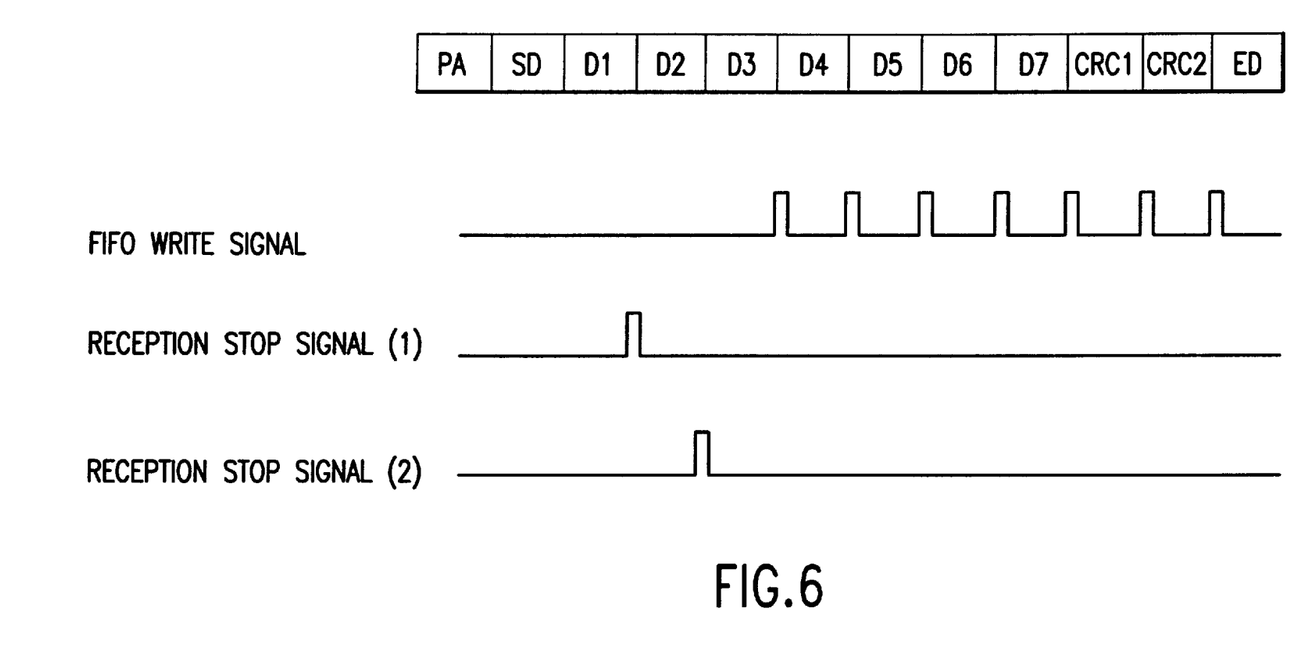
FIG. 6 shows a timing for automatic reception stoppage according to one embodiment of the communication apparatus of the invention.
Figure 7:
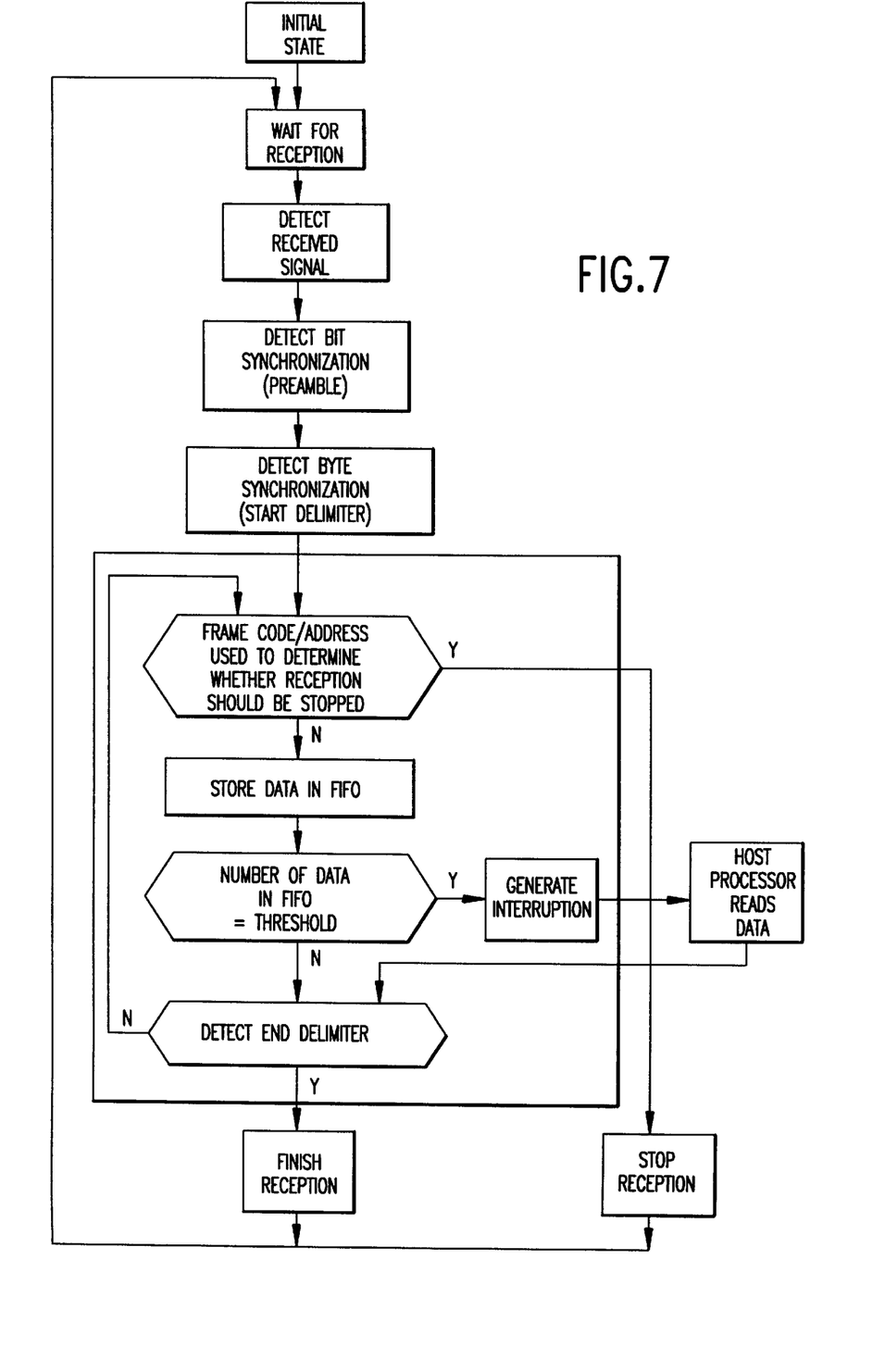
FIG. 7 shows a flow chart of a reception operation according to one embodiment of the communication apparatus of the invention.
Figure 8:
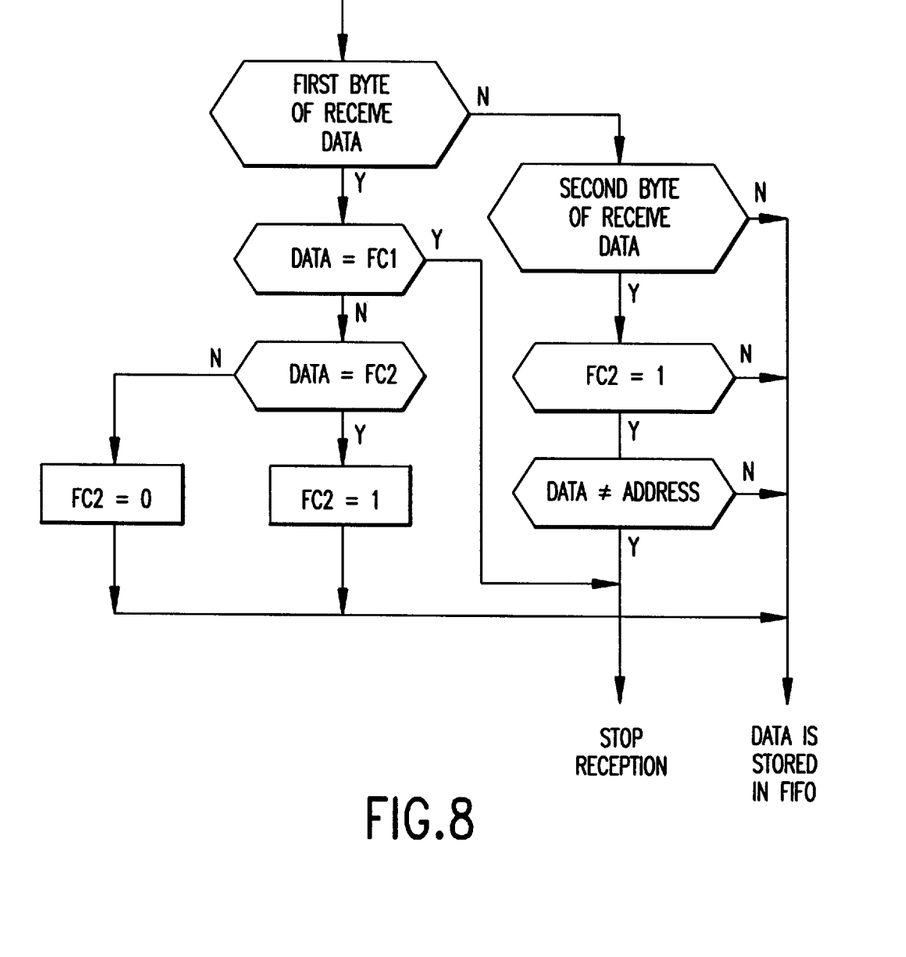
FIG. 8 shows a flow chart of the stoppage of reception and the writing of data to FIFO according to one embodiment of the communication apparatus of the invention.

FIGS. 6, 7 and 8 show an automatic reception stop timing diagram, reception operation flow chart, and reception stop flow chart of one embodiment of the communication apparatus according to this invention.

According to FIG. 6, even if the second-byte address is obtained before outputting the stop signal, the stop signal is outputted to stop the operation before the first byte of data is written to the FIFO to thereby prevent the data from being written to the FIFO.

FIG. 7 is a flow chart showing a reception operation. If it is determined that the received data is invalid, reception is immediately stopped and no interrupt signal is generated to the host processor or microcontroller.

FIG. 8 is a flow chart showing the stoppage of reception and the writing of data to the FIFO. If the communication apparatus considers the transmit frame valid, the data is written to the FIFO, and the data stored therein is considered valid.

According to this invention, the automatic reception stop circuit built in the interface control circuit automatically stops the reception of data that is not required by the receiving communication apparatus.

If the received data is required by the communication apparatus, an interrupt signal is inputted to the microcomputer, which is in a sleep mode, to make it operative.

Since the microcontroller remains in the sleep mode until the data required by the communication apparatus is received, the power consumption of the microcontroller can be reduced by 50 to 80%.

The interface control circuit stops reception once one byte of data that is not required by the communication apparatus is received.

If data that is not required by the communication apparatus is to be received, the interface control circuit according to this invention can reduce power consumption by 50 to 70% compared to the conventional interface control circuits, which receive 4 bytes before stopping reception.

What is claimed is:

1. A system for communicating a plurality of communication apparatuses connected by a pair of transmission paths for mutual transmission and reception, wherein each communication apparatus includes a host processor, and an interface circuit for working with the host processor to control input and output data between the host processor and the transmission paths, said interface circuit comprising a frame formation circuit for forming a specific code in a transmit frame when data written by the host processor is converted into the transmit frame; and an automatic reception stop circuit having a first pattern register for registering a frame code pattern to stop reception of a receiving frame, a second pattern register for registering the frame code pattern to stop reception of the receiving frame, an address register for registering a receiving address coupled with the second pattern register, a data register for storing data of first and second bytes of the receiving frame, and a comparison and reset generation circuit connected to the first pattern register, the second pattern register with the address register and the data register, said comparison and reset generation circuit, when said receiving frame sent by another communication apparatus is received, comparing a frame code pattern and a receiving address included in the receiving frame and stored in the data register with the frame code pattern and the receiving address registered in the first pattern register and the second pattern register with the address register and stopping receipt of the receiving frame without actuating the host processor when the data of the first and second bytes is not accepted by the first pattern register and the second pattern register with the address register.

2. A communication system according to claim 1, wherein said host processor includes means for changing the value of the code written to said automatic reception stop circuit beforehand.

3. A communication system according to claim 1, wherein said interface circuit stops reception of the receiving frame before informing said host processor of presence of receive data by using an interrupt signal.

4. A communication apparatus for a mutual communication through a transmission path, comprising, a host processor, an interface circuit electrically connected to the host processor, said interface circuit controlling input and output data between the host processor and the transmission path, and having a frame formation circuit for forming a specific code in a transmit frame when data written by the host processor is converted into the transmit frame, and an automatic reception stop circuit electrically connected to the host processor, said automatic reception stop circuit having a first pattern register for registering a frame code pattern to stop reception of a receiving frame, a second pattern register for registering the frame code pattern to stop reception of the receiving frame, an address register for registering a receiving address coupled with the second pattern register, a data register for storing data of first and second bytes of the receiving frame, and a comparison and reset generation circuit connected to the first pattern register, the second pattern register with the address register and the data register, said comparison and reset generation circuit, when said receiving frame sent by another communication apparatus is received, comparing a frame code pattern and a receiving address included in the receiving frame and stored in the data register with the frame code pattern and the receiving address registered in the first pattern register and the second pattern register with the address register and stop-receiving of the receiving frame without actuating the host processor when the data of the first and second bytes is not accepted by the first pattern register and the second pattern register with the address register.

5. A communication apparatus according to claim 4, wherein said host processor includes means for changing the value of the code written to said automatic reception stop circuit beforehand.

6. A communication apparatus according to claim 5, wherein said interface circuit stops reception of the receiving frame before informing said host processor of presence of receive data by using an interrupt signal.

7. A communication system according to claim 1, wherein said first pattern register is arranged parallel to the second pattern register coupled with the address register with respect to the host processor.

8. A communication system according to claim 7, wherein said first and second bytes of the receiving frame include the frame code pattern and the receiving address.

* * * * *

UNITED STATES PATENT AND TRADEMARK OFFICE
CERTIFICATE OF CORRECTION

PATENT NO. : 5,889,817
DATED : March 30, 1999
INVENTOR(S) : Yutaka Yoshida

It is certified that error appears in the above-indentified patent and that said Letters Patent is hereby corrected as shown below:

In column 4, line 55, change "th e" to --the--;

In column 5, line 47, change "from" to --frame--; and

In column 7, line 15, change "microcomputer" to --microcontroller--.

Signed and Sealed this

Twenty-fourth Day of August, 1999

Attest:

Attesting Officer

Q. TODD DICKINSON

Acting Commissioner of Patents and Trademarks